Patented Mar. 15, 1938

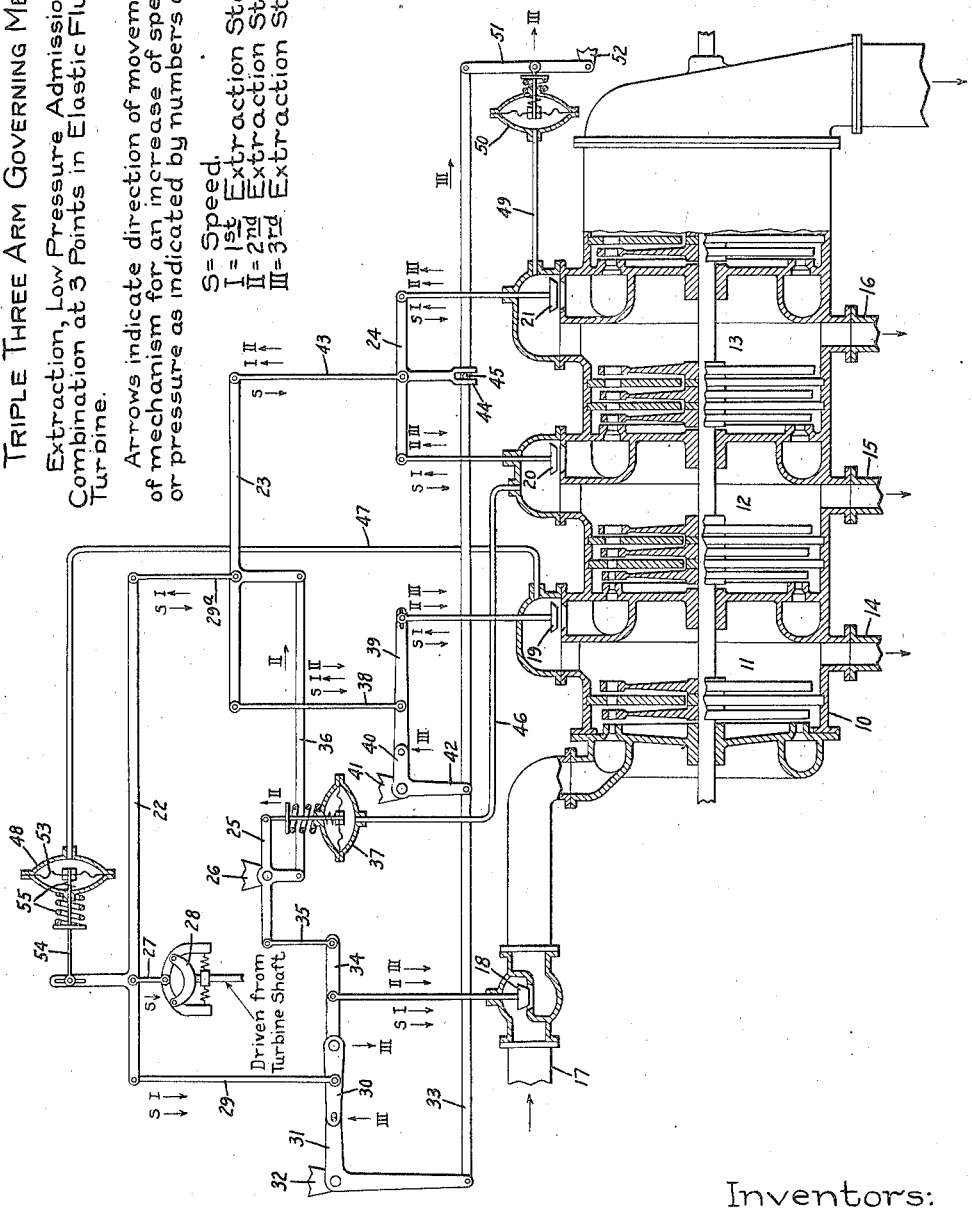

2,111,420

UNITED STATES PATENT OFFICE 2,111,420

GOVERNING MECHANISM FOR ELASTIC FLUID TURBINES

Franklin R. Ericson, Marblehead, and Edgar D. Dickinson, Lynn, Mass., assignors to General Electric Company, a corporation of New York Application December 5, 1935, Serial No. 53,010

2 Claims. (Cl. 60—67)

The present invention relates to governing mechanisms for multi-stage elastic fluid turbines from which elastic fluid is extracted from or conducted to several intermediate stages. In the first case, where elastic fluid is extracted at different pressures from several stages, the turbine is said to operate as a multi-extraction turbine and in the second case, where elastic fluid is supplied to several intermediate stages, the turbine may be said to operate as a multi-mixed-pressure turbine. It is often required to maintain constant the elastic fluid pressure in those stages from which elastic fluid is extracted or to which elastic fluid is conducted from an external source. Thus, in a turbine which has two extraction stages it may be required to maintain the pressures in these stages constant under varying flow conditions in the extraction conduits, that is, during varying demand for extraction fluid. In addition to this requirement, it is often desirable to maintain constant load during variations in demand for extraction steam and, vice versa, to maintain the extraction pressure or like condition of the extracted fluid constant during changes in demand for mechanical load output.

Our invention relates primarily to governing mechanisms for turbines having at least two intermediate stages to which fluid is supplied under varying pressure from an external source or from which fluid is extracted under different pressures to be used for processing purposes or the like.

The object of our invention is to provide for the kind of turbines just specified a governing mechanism whereby the flow of elastic fluid through the turbine may be controlled so as to maintain constant a condition such as the pressure of the elastic fluid at several intermediate stages during varying mechanical load conditions, and also to maintain constant a condition of the fluid at several intermediate stages during varying flow of elastic fluid to or from such intermediate stages under constant load conditions. This is accomplished by our invention by the provision of a multiple, three-arm lever mechanism comprising a plurality of interconnected pressure and load responsive devices. The mechanical load output control is effected by the load responsive device such as a speed governor and the control of elastic fluid pressure at several stages is effected by pressure responsive devices.

By three-arm levers we means levers having three arms securely fastened together or integrally united to form a common or star point. Such three-arm levers are moved in parallel in response to changes in mechanical load output and they are turned in response to changes in elastic fluid conditions in a conduit or conduits connected to intermediate stages.

For a full understanding of what we believe to be novel and our invention, attention is directed to the following description and the claims appended thereto in connection with the accompanying drawing.

The single figure of the drawing illustrates a governing mechanism embodying our invention in connection with a multi-extraction turbine arrangement.

The governing mechanism is shown diagrammatically without the provisions of hydraulic motors and pilot valves. The elastic fluid multi-stage extraction turbine arrangement is shown in the form of a single turbine having a casing 10 and forming a succession of intermediate stages 11, 12, 13 connected in series as regards the flow of fluid therethrough and from which elastic fluid is extracted through conduits 14, 15 and 16 respectively. The turbine has an inlet conduit 17 including a valve 18 for controlling the flow of elastic fluid supplied to the turbine. The flow of elastic fluid from intermediate stages to the succeeding stages is controlled by valves 19, 20 and 21. In the present instance these valves have been indicated as being of the disk type but it is understood that any other known type of interstage valve may be used. The governing mechanism according to our invention serves to control the inlet valve and the interstage valves so as to maintain constant the mechanical load output in response to changes of a condition of the elastic fluid extracted from any of the intermediate stages and also to maintain constant the condition of the fluid extracted from the several intermediate stages during changes in demand for mechanical load output. In the present instance the governing mechanism serves more specifically to maintain constant the pressure in the extraction stages during changes in demand for extraction fluid from any of the stages and during changes in demand for mechanical load output. Thus, in a specific arrangement, the governing mechanism may maintain constant pressures of 400, 300 and 100 lbs. in the intermediate stages 11, 12 and 13 respectively during changes in demand for extraction fluid and mechanical load output.

The governing mechanism more in detail includes three three-arm levers, a first three-arm lever 22, a second three-arm lever 23 and a third three-arm lever 24. The three-arm levers 22, 23 and 24 are in floating arrangement. Another lever 25 with three arms is not a three-arm lever in the above meaning because it is pivotally supported on a fulcrum 26. Each three-arm lever, as will be readily noted, has a first or left-hand arm, a second or right-hand arm and a third, vertical, or upright arm. The first three-arm lever 22 is connected by a link 27 to a centrifugal speed governor or load responsive device 28. The left-hand arm of the three-arm lever 22 is connected by a link 29 to an intermediate point of a floating lever 30. The right-hand arm of the three-arm lever 22 is connected by another link 29a to the second three-arm lever 23. The left-hand arm of the floating lever 30 is pivoted to one arm of a bell-crank lever 31 supported on a fulcrum 32. The other arm of the bell-crank lever 31 is pivoted to the left-hand end of a lever 33. The right-hand end of the floating lever 30 is connected to another floating lever 34 which has an intermediate point pivotally secured to the inlet valve 18. The right-hand end of the lever 34 is connected by a link 35 to the left-hand arm of the fourth three-arm lever 25. The upright arm of the latter is pivotally connected by a link 36 to the upright arm of the second three-arm lever 23. The right-hand arm of the three-arm lever 25 is connected to the diaphragm of a pressure-responsive device 37. The left-hand arm of the second three-arm lever 23 is connected by a link 38 to a floating lever 39 having a right-hand end pivotally secured to the valve 19 and a left-hand end pivotally connected to one arm of a bell-crank lever 40 which is supported on a fulcrum 41 and has another arm 42 pivotally connected to the aforementioned lever 33. The right-hand arm of the three-arm lever 23 is connected by a link 43 to the lever 24. The upright arm of the latter forms a fork 44 engaging a pin 45 secured to the lever 33. The left-hand arm of the three-arm lever 24 is connected to the valve 20 and the right-hand arm thereof is connected to the valve 21.

The arrangement includes a pressure-responsive device for each extraction stage. The aforementioned pressure-responsive device 37 is connected by a pipe 46 to the second intermediate or extraction stage 12. The first extraction stage 11 is connected by a pipe 47 to a pressure-responsive device 48 which in turn is connected to the upright arm of the first three-arm lever 22. The third extraction stage 13 is connected by a pipe 49 to a pressure-responsive device 50 which acts on a lever 51 having a lower end supported on a fulcrum 52 and an upper end pivotally connected to the right-hand end of the lever 33. The three pressure-responsive devices are similar and known in the art. Each device includes a casing with a diaphragm 53 as indicated with respect to the device 48. The diaphragm partitions the interior of the casing into two halves or spaces. One of said spaces is connected by the pipe 47 to the intermediate stage 11. A stem or link 54 is secured at one end to the diaphragm and at the other end to the element through which movement of the diaphragm is to be transmitted in the present instance to the three-arm lever 22. The elastic fluid pressure to which the diaphragm is subjected during operation is balanced by compression spring means 55, in the present instance provided within the casing and external thereof.

During operation the following conditions may occur: a change in pressure in either of the three extraction stages, due to a change in demand for extraction elastic fluid from such stages, a change in turbine speed due to a change in the demand for mechanical load output and any combination of these changes. The operation of the mechanism is the same whether a change takes place in one direction or the other, that is, whether the pressure and speed increase or decrease except that the elements actuated under such conditions move in opposite directions. The movements of the different elements under these different conditions have been indicated by arrows in the drawing with respect to increases in pressure and increases in turbine speed. Thus, the arrows S indicate the movements of the various elements in response to an increase in speed and the arrows I, II, III indicate the movements of the various elements in response to increases in pressure in the first, second and third extraction stage respectively.

Thus, an increase in speed, due to a decrease in demand for mechanical load output, causes downward movement of the three-arm lever 22, as indicated by arrows S adjacent the links 29 and 29a. Downward movement of the link 29 effects downward turning movement of the levers 30 and 34 whereby the valve 18 is moved towards closing position, as indicated by arrow S adjacent the valve stem. The lever 30 during its downward movement turns about its left-hand pivot and the lever 34 under such condition turns about its right-hand pivot. Downward movement of the link 29a effects downward movement of the second three-arm lever 23, as indicated by arrows S adjacent the links 38 and 43. Downward movement of the link 38 effects downward turning movement of the lever 39 about its left-hand end whereby the valve 19 is moved towards its closing position, as indicated by an arrow S adjacent the valve stem. Downward movement of the link 43 causes downward movement of the third three-arm lever 24, effecting simultaneous closing movement of the valves 20 and 21, as indicated by the arrows S adjacent the valve stems. During downward movement of the three-arm lever 24 the fork 44 slides along the pin 45 without effecting any movement of the connecting rod 33.

Thus, an increase in speed, due to a decrease in demand for mechanical load output, causes closing of all the valves 18, 19, 20 and 21. This closing movement effects a reduction in flow of elastic fluid through the turbine and thereby reduces the mechanical load output. Closing movement of the valve 18 alone would ordinarily cause a decrease in pressure in the first extraction stage 11, thus disturbing the condition of the elastic fluid in the first extraction conduit 14. Such disturbance, however, is prevented and the pressure is maintained constant by the closing movement of the valve 19. This also applies to the other extraction stages. Thus, by properly proportioning the valve sizes, the pressure in all of the extraction stages is maintained constant during changes in mechanical load output.

If the pressure in the first extraction stage increases, due to a decrease in demand for extraction fluid from the first stage, the governing mechanism as indicated by arrows causes closing of the turbine inlet valve and opening of the interstage valves 19, 20 and 21, thereby satisfying the demand for elastic fluid from the first intermediate stage 11 without changing the elastic fluid conditions in the other intermediate stages 12 and 13 and also without changing the mechanical load output.

If the pressure in the last intermediate stage increases, the governing mechanism causes closing of the inlet valve, the first and the second interstage valves 19 and 20, and opening of the valve 21 of the last extraction stage 13.

Generally it may be said that if in a system which includes $n$ extraction stages an increase in pressure takes place in the stage $n-m$, a governing mechanism according to our invention will effect closing of the inlet valve, the first extraction stage valve to the $n-m^{th}$ extraction stage valve and opening of the $n-m^{th}+1$ extraction stage valve, to the $n^{th}$ extraction stage valve. Thus, in a system which includes seven extraction stages, an increase in pressure in the fifth extraction stage will cause closing of the turbine inlet valve, the first, second, third, fourth and fifth extraction stage valves, and opening of the sixth and seventh extraction stage valves. During an increase in speed, due to a decrease in demand for mechanical load output, all the valves are closed and during a decrease in speed, all valves are opened. Similarly, during a decrease in pressure in one of the extraction stages, all of the valves are moved in opposite directions as pointed out above.

What we claim as new and desire to secure by Letters Patent in the United States is:

1. A governing mechanism for multi-stage extraction and multi-stage mixed pressure turbine arrangements for controlling such turbine arrangements both in response to changes in demand for mechanical load output and changes in demand for extraction fluid, said governing mechanism including a number ($n$) of floating three-arm levers equal to the number of extraction stages, the first lever having a first arm for connection to a turbine inlet valve, the second lever having a first arm for connection to a first intermediate stage control valve, the $n^{th}$ lever having a first arm for connection to a $(n-1)^{th}$ intermediate stage control valve, the first lever having a second arm connected to the common point of the second lever, the second lever having a second arm connected to the common point of the third lever, a pressure responsive device for connection to a first intermediate stage and connected to the third arm of the first lever, a second pressure responsive device for connection to a second intermediate stage being connected to the third arm of the second lever, a third pressure responsive device for connection to a third intermediate stage being connected to the third arm of the last lever, and a speed-responsive device for connection to the turbine shaft being connected to the common point of the first lever.

2. A governing mechanism for multi-stage extraction and multi-stage mixed pressure turbine arrangements including the combination of a first three-arm lever having a first arm for connection to a turbine inlet valve, a speed governor connected to the common point of said first three-arm lever, a pressure responsive device for connection to a first intermediate stage being connected to the third arm, a second three-arm lever having a common point connected to the second arm of the first three-arm lever, means for connecting the first arm of the second three-arm lever to a first inter-stage valve, a second pressure responsive device for connection to a second intermediate turbine stage being connected to the third arm of the second three-arm lever, a third three-arm lever having a common point connected to the second arm of the second three-arm lever, a pressure responsive device for connection to a third inter-stage valve being connected to the third arm of the third three-arm lever, and means for connecting the first and the second arm of the third three-arm lever to a second and a third inter-stage valve.

FRANKLIN R. ERICSON.
EDGAR D. DICKINSON.